US008583596B2

(12) United States Patent
Rowley

(10) Patent No.: US 8,583,596 B2
(45) Date of Patent: Nov. 12, 2013

(54) MULTI-MASTER REFERENTIAL INTEGRITY

(75) Inventor: Peter Andrew Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 883 days.

(21) Appl. No.: 11/606,715

(22) Filed: Nov. 29, 2006

(65) Prior Publication Data

US 2008/0126499 A1    May 29, 2008

(51) Int. Cl.
*G06F 7/00*    (2006.01)

(52) U.S. Cl.
USPC .......................................................... 707/610

(58) Field of Classification Search
USPC .......................................... 707/104.1, 10, 1
See application file for complete search history.

(56) References Cited

U.S. PATENT DOCUMENTS

| | | | | |
|---|---|---|---|---|
| 5,812,130 | A * | 9/1998 | Van Huben et al. | 715/764 |
| 5,826,265 | A * | 10/1998 | Van Huben et al. | 1/1 |
| 5,968,121 | A * | 10/1999 | Logan et al. | 709/219 |
| 6,088,693 | A * | 7/2000 | Van Huben et al. | 1/1 |
| 6,256,634 | B1 * | 7/2001 | Moshaiov et al. | 1/1 |
| 6,553,384 | B1 * | 4/2003 | Frey et al. | 1/1 |
| 6,728,762 | B1 * | 4/2004 | Estrada et al. | 709/218 |
| 6,768,988 | B2 | 7/2004 | Boreham et al. | |
| 6,785,686 | B2 | 8/2004 | Boreham et al. | |
| 7,016,893 | B2 | 3/2006 | Boreham et al. | |
| 7,016,907 | B2 | 3/2006 | Boreham et al. | |
| 7,020,662 | B2 | 3/2006 | Boreham et al. | |
| 7,054,910 | B1 * | 5/2006 | Nordin et al. | 709/208 |
| 7,107,293 | B2 * | 9/2006 | Booz et al. | 707/686 |
| 7,130,839 | B2 | 10/2006 | Boreham et al. | |
| 7,421,659 | B2 * | 9/2008 | Estrada et al. | 715/751 |
| 7,617,289 | B2 * | 11/2009 | Srinivasan et al. | 709/209 |
| 7,779,034 | B2 * | 8/2010 | Pedersen et al. | 707/781 |
| 7,899,788 | B2 * | 3/2011 | Chandhok et al. | 707/640 |
| 2001/0034733 | A1 * | 10/2001 | Prompt et al. | 707/102 |
| 2003/0065796 | A1 * | 4/2003 | Borr | 709/229 |
| 2003/0088656 | A1 * | 5/2003 | Wahl et al. | 709/223 |
| 2004/0133606 | A1 * | 7/2004 | Miloushev et al. | 707/200 |
| 2004/0133629 | A1 * | 7/2004 | Reynolds et al. | 709/202 |
| 2004/0267832 | A1 * | 12/2004 | Wong et al. | 707/200 |
| 2006/0230121 | A1 * | 10/2006 | Arndt et al. | 709/217 |

OTHER PUBLICATIONS

PCT International Preliminary Report on Patentability (Chapter 1 of the Patent Cooperation Treaty), PCT/US2007/020553 filed Sep. 20, 2007, mailed Jun. 11, 2009.

* cited by examiner

*Primary Examiner* — Eliyah S Harper
(74) *Attorney, Agent, or Firm* — Lowenstein Sandler LLP

(57) ABSTRACT

A method and apparatus for maintaining referential integrity in a plurality of directory servers is described. In one embodiment, a first directory server receives a request to operate on an entry in the first directory server. The request is serially repeated in at least one other directory server if the operation on the entry in the first directory server is not valid. The at least one other directory server communicates indirectly with the first directly server.

28 Claims, 5 Drawing Sheets

MULTI-MASTER REFERENTIAL INTEGRITY

TECHNICAL FIELD

Embodiments of the present invention relate to referential integrity in a file system, and more specifically to multi-master referential integrity of directory servers.

BACKGROUND

Referential integrity in a relational database is consistency between coupled tables. Referential integrity is usually enforced by the combination of a primary key or candidate key and a foreign key. For referential integrity to hold, any field in a table that is declared a foreign key can contain only values from a parent table's primary key or a candidate key. For instance, deleting a record that contains a value referred to by a foreign key in another table would break referential integrity. The relational database management system (RDBMS) enforces referential integrity, normally either by deleting the foreign key rows as well to maintain integrity, or by returning an error and not performing the delete. Which method is used would be defined by the definition of the referential integrity constraint.

In the context of a directory server, such as a Light Weight Directory Access Protocol (LDAP), referential integrity can fail for multi-master replication scenarios. A master server may have replication agreements with other connected master servers. In such a replicated system, an attempt to add a reference that points to an entry that does not exist on the local server will fail, even when that entry has been added in another server but has yet not been replicated to the local server. Another problem with such a system is that not all master servers are in direct communication with each other. A delay or timing issue may arise as a result of such indirect connection. One solution to preventing such a referential integrity failure is to lock down the network to propagate any necessary changes. However, locking the network presents many disadvantages such as introducing further delay and down time.

DESCRIPTION OF THE DRAWINGS

The present invention is illustrated by way of example, and not by way of limitation, in the figures of the accompanying drawings and in which.

DETAILED DESCRIPTION

Figure 1:
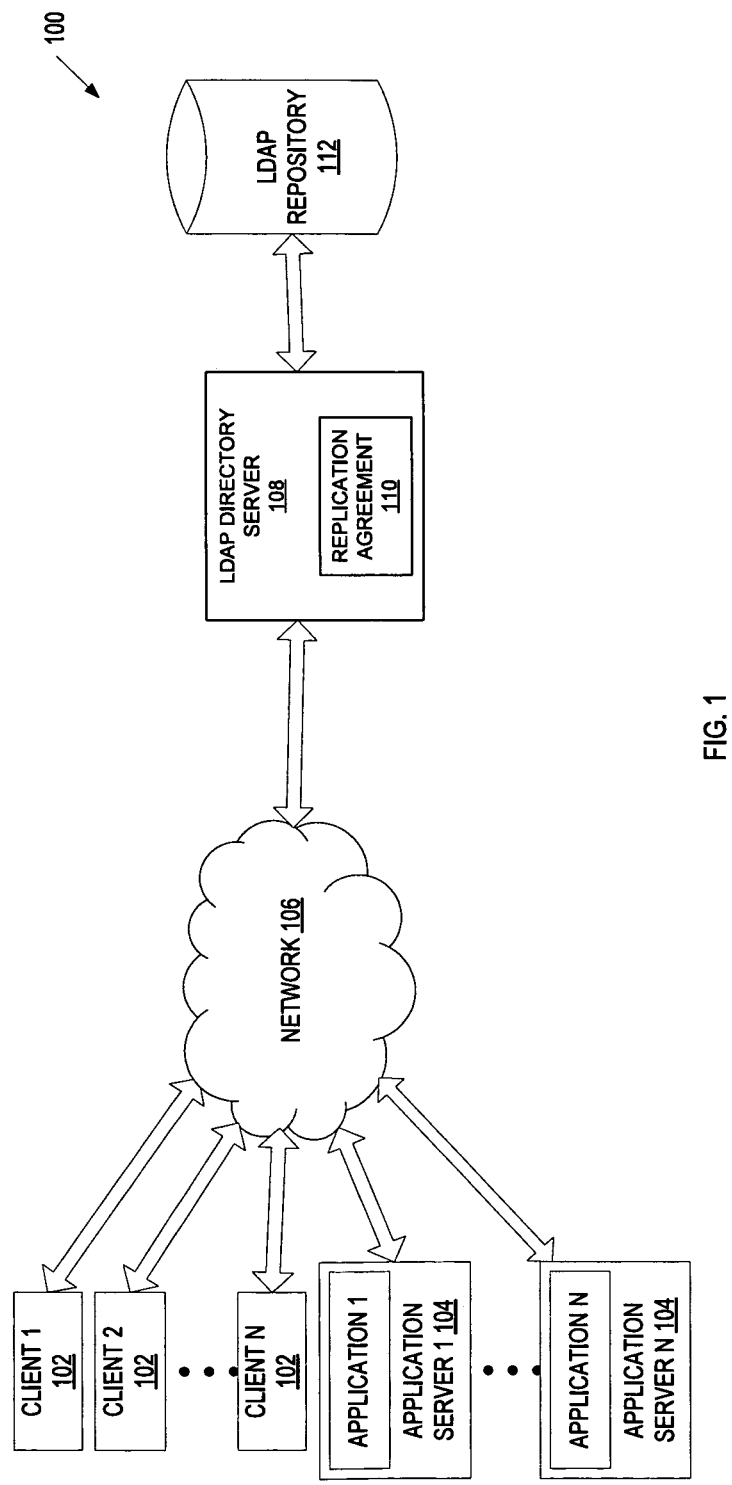
FIG. 1 illustrates a network architecture in which embodiments of the present invention may be implemented.

Described herein is a method and apparatus for maintaining referential integrity in a plurality of master directory servers. A first master directory server receives a request to operate on an entry in the first master directory server. The request is serially repeated in at least one other master directory server if the operation on the entry in the first master directory server is not valid. At least one of the other master directory servers communicates indirectly with the first master directly server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 is a master directory server that includes a replication agreement module 110 with at least one other master directory server. The replication agreement module 110 may be part of the LDAP directory server 108 or some other device and/or program, or be an independent module implemented in hardware, software or a combination thereof. In one embodiment, the replication agreement module 110 includes a multi-master replication agreement with one or more directly coupled master servers and one or more indirectly coupled master servers.

In accordance with one embodiment, the LDAP directory server 108 receives a request to operate on an entry in the LDAP repository 112. Before the LDAP directory server 108 operates on the entry, it determines whether the requested operation is valid on the LDAP repository 112. If the operation on the entry in the LDAP directory server 108 is not valid, the request is serially repeated in at least one other master directory server that has a multi-master replication agreement with the LDAP directory server 108. The request is serially repeated in other master directory servers until either all directory servers have been reached (and the operation thus fails) or until one directory server responds with a success code.

Figure 2:
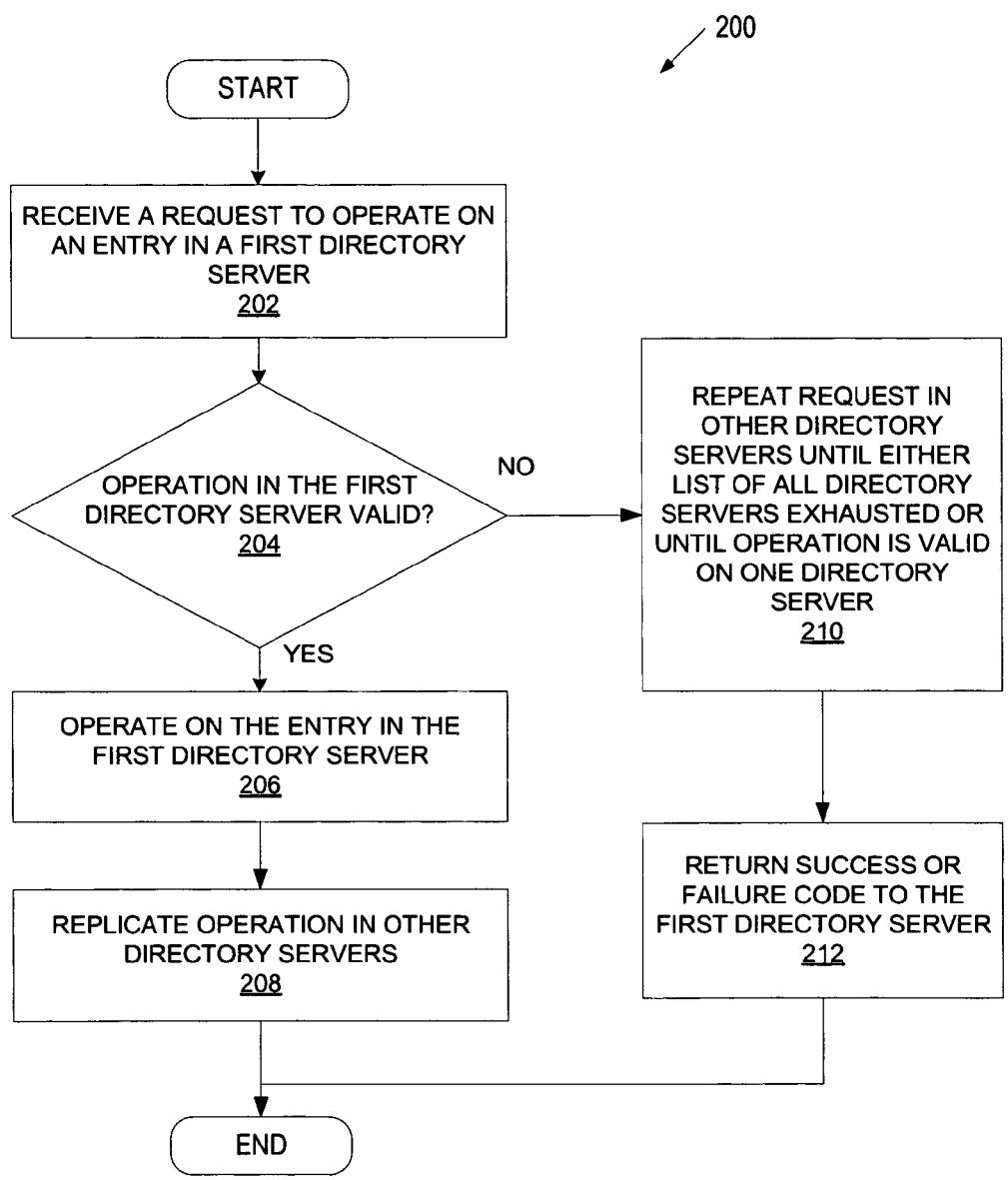
FIG. 2 illustrates a flow diagram of one embodiment of a method for maintaining multi-master referential integrity of a network of master directory servers.

FIG. 2 illustrates a flow diagram of one embodiment of a method 200 for maintaining referential integrity in a group of master directory servers having replication agreements. The method may be performed by processing logic that may comprise hardware (e.g., circuitry, dedicated logic, programmable logic, microcode, etc.), software (such as instructions run on a processing device), or a combination thereof. In one embodiment, method 200 is performed by the replication agreement module 110 of the LDAP directory server 108 of FIG. 1.

Referring to FIG. 2, at block 202, a processing logic of the LDAP directory server 108 receives a request to operate on an entry in the LDAP repository 112. The operation may be, for example, adding, deleting, modifying an entry in the LDAP repository 112.

At block 204, processing logic determines whether the requested operation on the entry in the LDAP repository 112 is valid or legal. For example, an attempt may be made to add a reference to an entry that does not exist in the LDAP repository 112. Such an operation would thus be illegal or not valid. In such case, at block 210, the LDAP directory server 108 attempts to perform the same operation on each of its directory server peers having multi-master replication agreements until either the list of peers has been exhausted (which means that the operation has failed) or until one of the peer master directory server can legally perform the operation. At block 212, either a failure code or a success code is returned to the LDAP directory server 108.

On the other hand, if the entry already exists in the LDAP repository 112, the operation can be performed in the LDAP repository 112 at block 206. The operation is replicated in other master directory servers having a replication agreement directly or indirectly with the LDAP directory server 108 at block 208.

Figure 3:
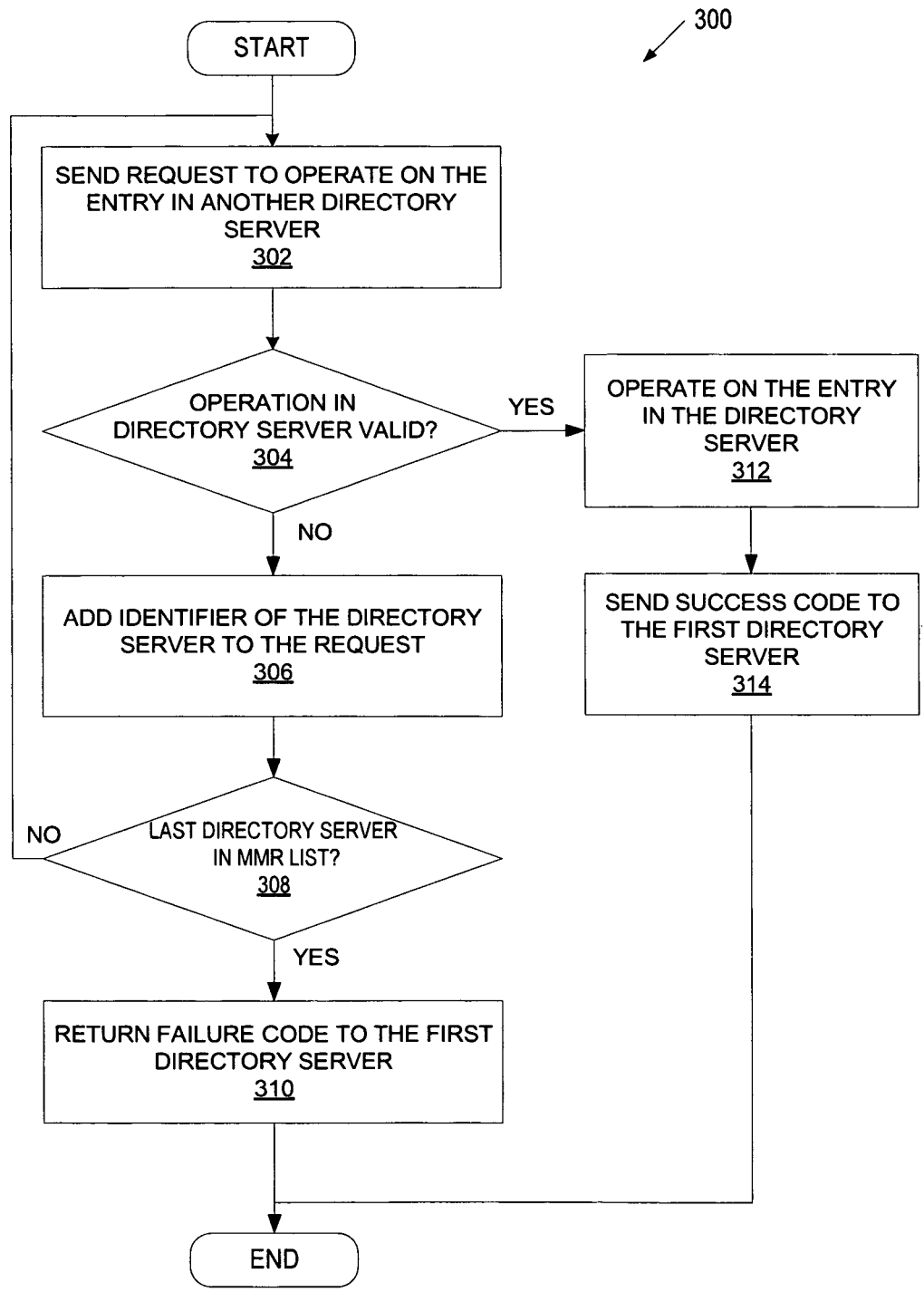
FIG. 3 illustrates a flow diagram of another embodiment of a method for maintaining multi-master referential integrity of a network of master directory servers.

FIG. 3 illustrates a flow diagram 300 detailing the process illustrated in FIG. 2. Referring to FIG. 3, at block 302, the LDAP directory server 108 receives a request to operate on an entry in the LDAP repository 112. The operation may be, for example, adding, deleting, modifying an entry in the LDAP repository 112.

At block 304, processing logic determines whether the requested operation on the entry in the LDAP repository 112 is valid or legal. For example, an attempt may be made to add a reference to an entry that does not yet exist in the LDAP repository 112. Such an operation would thus be illegal or not valid. In such case, the LDAP directory server 108 attempts to perform the same operation on each of its directory server peers having multi-master replication agreements. The operation is performed with a special control structure which contains an identifier for the originating server, e.g. LDAP directory server 108. When a peer master server receives an operation with such a control, it attempts to perform the same operation as the first server (i.e. the originating server). If no entry exist locally on the peer master server, the peer master server adds its own identifier to the controls list of servers at block 306.

At block 308, an attempt to perform the operation is repeated on another peer master server except for those servers already identified in the control list. In one embodiment, the identifier of each peer master server is added to the request after an attempt to perform on a corresponding peer master server. Thus, no peer master server is visited more than once.

At block 310, if all the peer master servers have been visited and no operation can still be performed on any of the peer master servers, a failure code may be returned to the originating master server. In accordance with one embodiment, the failure code may also include a list of peer master servers visited for this operation. In accordance with another embodiment, when responding to a query with the control, a response control is returned on success on on failure that also contains the list of servers visited for the operation. When traversing the list of peer master servers, the response control returned from the last queried server is used for building the control for the next server so that no server is ever visited more than once.

In accordance with one embodiment, a peer master server which returns a success code may take action to prioritize the replication of the entry in question before returning a success code to the originating master server. At block 312, if the operation is valid on a peer master server, the operation is first performed on that peer master server. A success code is then transmitted to the originating master server at block 314. Taking such action would mean that the entry is propagated back to the originating server so that its referential integrity may be guaranteed.

In accordance with another embodiment, it might be sufficient to just return a success code so that the reference may be added. The entry will eventually turn up because of the replication agreements of the connected master servers.

Figure 4:
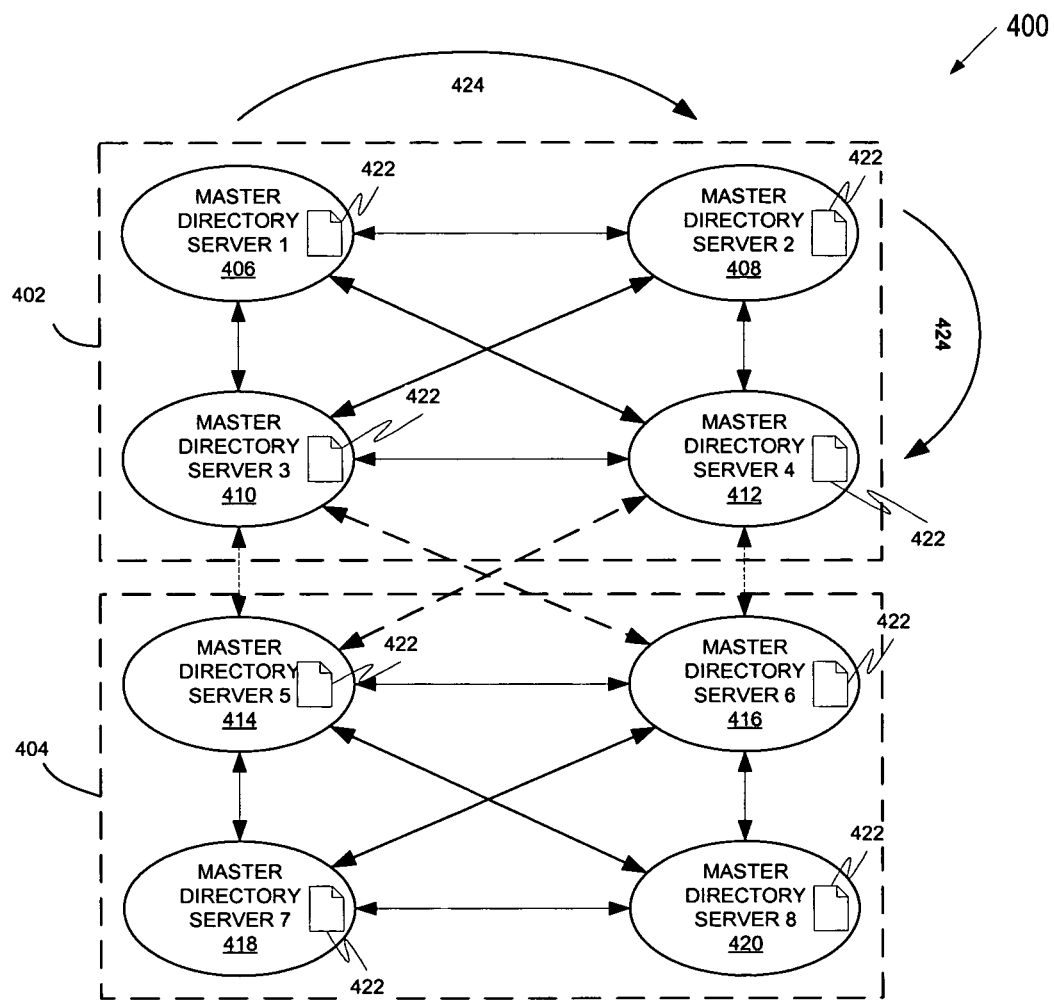
FIG. 4 illustrates a block diagram of a network of master directory servers in accordance with one embodiment.

FIG. 4 is a block diagram illustrating a method for maintaining referential integrity in a multi-master replication network of master servers without having to lock down the network. In one embodiment, FIG. 4 illustrates a loosely consistent network of master servers. In one embodiment, the master servers may include directory servers, such as LDAP directory servers. A first group of master servers 402 is coupled to a second group of master servers 404. The first group of master servers 402 may include interconnected master servers 406, 408, 410, 412. The second group of master servers 404 may include interconnected master servers 414, 416, 418, and 420. Each master server include a MMR (multi-master referential) replication agreement 422 with each other. Each master server is also directly connected to all the remaining master servers from the same group.

At least one master server from the first group of master servers 402 is directly connected to at least one master server from the second group of master servers 404. In the example of FIG. 4, master server 410 of the first group 402 is directly connected to master servers 414 and 416 of the second group 404. Master server 412 of the first group 402 is directly connected to master servers 414 and 416 of the second group 404. Thus at least one or more master server from the first group 402 is indirectly connected to at least one or more master server from the second group 404.

In the example of FIG. 4, a master server 406 receives a request to perform an operation on an entry in the master server 406. If the operation in the first master server, e.g. master server 406, is not valid or legal, the first master server responds by attempting to perform the same operation on its peers. Control data 424 is serially sent to a master server that has not been visited. The control data 424 may include unique identifiers of the previously visited master servers. When traversing the list of master servers, the response control returned from the latest queried master server is used for building the control for the next master server so that no master server is ever visited more than once.

In accordance with one embodiment, this chaining effect allows the network of MMR servers to maintain integrity without having to lock down the network. The chaining effect allows for discovering and querying other master servers that are not directly connected to the first master server via a replication agreement.

Figure 5:
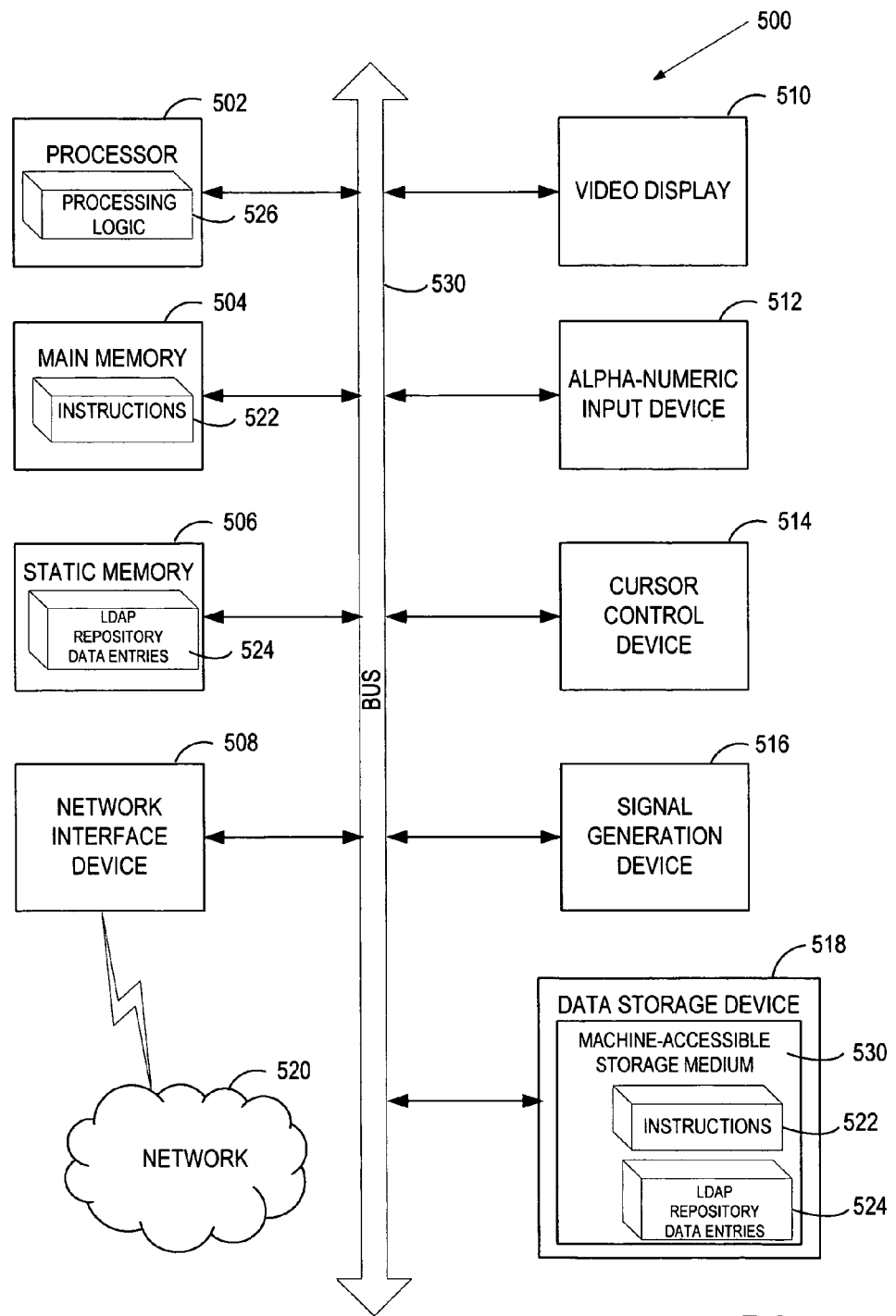
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for dynamically managing groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, the method comprising:
    receiving, by a first directory server of a plurality of directory servers, a request to perform an operation on an entry in the first directory server;
    determining, by the first directory server, whether the operation on the entry in the first directory server is valid, wherein the operation on the entry in the first directory server is valid when the entry exists in a repository associated with the first directory server, and wherein the operation on the entry in the first directory server is not valid when the entry does not exist in the repository associated with the first directory server;
    when the operation on the entry in the first directory server is valid, performing, by the first directory server, the operation on the entry in the first directory server;
    when the operation on the entry in the first directory server is not valid, forwarding, by the first directory server, the request to a next directory server of the plurality of directory servers, the next directory server having a multi-master replication agreement with the first directory server;
    when the operation on the entry in a current directory server is not valid, continuing forwarding, by the current directory server, the request from the current directory server to a next directory server of the plurality of directory servers to find a peer directory server of the plurality of directory servers in which the operation on the entry is valid, the next directory server having the multi-master replication agreement with the first directory server;
    when the operation on the entry is valid in the peer directory server, performing, by the peer directory server, the request in the peer directory server; and
    when the operation on the entry is not valid in any directory server of the plurality of directory servers, returning a failure for the request,
    wherein at least one other directory server of the plurality of directory servers is not directly associated with the first directory server.

2. The method of claim 1 wherein the request is forwarded to only one other directory server at a time, that has not been previously been forwarded to.

3. The method of claim 1 further comprising:
    returning a message of a validity of the operation when the operation on the entry is valid in at least one other directory server.

4. The method of claim 1, wherein returning a failure for the request to perform the operation comprises:
    returning a message of invalidity of the operation to an originating directory server.

5. The method of claim 1, wherein the operation on the entry in the current directory server is not valid when the entry is not present in the current directory server, and wherein the operation on the entry is not valid in any directory server of the plurality of directory servers when the entry is not present in any directory server of the plurality of directory servers.

6. The method of claim 1, wherein forwarding the request to the next directory server of the plurality of directory servers further comprises:
    adding an identifier of the first directory server to the request.

7. The method of claim 1, wherein forwarding the request from a current directory server to a next directory server further comprises:
    adding an identifier of the current directory server to the request when the operation on the entry in the current directory server is not valid.

8. The method of claim 7, wherein forwarding the request from a current directory server to a next directory server further comprises:
    forwarding the request to a subsequent directory server, wherein the subsequent directory server is not identified in the request, and the subsequent directory server has a multi-master replication agreement with the first directory server and the next directory server.

9. The method of claim 1, further comprising:
    when the operation on the entry is valid in at least one of the directory servers, operating on the entry in the plurality of directory servers prior to performing the request on the first directory server.

10. The method of claim 1 further comprising:
    maintaining referential integrity in the plurality of directory servers without locking the plurality of directory servers.

11. An apparatus comprising:
    a first directory server to receive a request to perform an operation on an entry in the first directory server, to determine whether the operation on the entry in the first directory server is valid, wherein the operation on the entry in the first directory server is valid when the entry exists in a repository associated with the first directory server, and wherein the operation on the entry in the first directory server is not valid when the entry does not exist in the repository associated with the first directory server, to perform the operation on the entry in the first directory server when the operation on the entry in the first directory server is valid, to perform the operation on the entry in the first directory server when the operation on the entry in the first directory server is valid, to forward the request to a next directory server when the operation on the entry in the first directory server is not valid, the next directory server having a multi-master replication agreement with the first directory server;

a next directory server to forward the request from the next directory server to at least one other directory server when the operation on the entry in the next directory server is not valid;

a current directory server to continue forwarding the request from the current directory server to a next directory server when the operation on the entry in the current directory server is not valid to find a peer directory server in which the operation on the entry is valid, to perform the request in the peer directory server when the operation on the entry is valid in the peer directory server, and to return a failure for the request when the operation on the entry is not valid in any directory server, wherein the first directory server is not directly associated with at least one other directory server, and the next directory server has the multi-master replication agreement with the first directory server.

12. The apparatus of claim 11 wherein the request is forwarded to only one other directory server at a time, that has not been previously been forwarded to.

13. The apparatus of claim 11 wherein the first directory server is to receive a message of a validity of the operation when the operation on the entry is valid in at least one other directory server.

14. The apparatus of claim 11, wherein the first directory server is to receive the failure for the request to perform the operation, wherein the failure comprises a message of invalidity of the operation.

15. The apparatus of claim 11, wherein the operation on the entry in the current directory server is not valid when the entry is not present in the current directory server, and wherein the operation on the entry is not valid in any directory server when the entry is not present in any directory server.

16. The apparatus of claim 11 wherein the first directory server is to add an identifier of the first directory server to the forwarded request.

17. The apparatus of claim 11 wherein the next directory server is to add an identifier of the next directory server to the forwarded request when the operation on the entry in the next directory server is not valid.

18. The apparatus of claim 17 wherein the current directory server is to forward the request on the entry to a subsequent directory server,
wherein the subsequent directory server is not identified in the request, and the subsequent directory server has a multi-master replication agreement with the first directory server and the next directory server.

19. A non-transitory computer-readable storage medium, having instructions stored therein, which when executed, cause a computer system to perform operations comprising:
receiving, by a first directory server of a plurality of directory servers in the computer system, a request to perform an operation on an entry in the first directory server;
determining, by the first directory server, whether the operation on the entry in the first directory server is valid, wherein the operation on the entry in the first directory server is valid when the entry exists in a repository associated with the first directory server, and wherein the operation on the entry in the first directory server is not valid when the entry does not exist in the repository associated with the first directory server;

when the operation on the entry in the first directory server is valid, performing, by the first directory server, the operation on the entry in the first directory server;

when the operation on the entry in the first directory server is not valid, forwarding, by the first directory server, the request to a next directory server of the plurality of directory servers, the next directory server having a multi-master replication agreement with the first directory server;

when the operation on the entry in a current directory server is not valid, continuing forwarding, by the current directory server, the request from the current directory server to a next directory server of the plurality of directory servers to find a peer directory server of the plurality of directory servers in which the operation on the entry is valid, the next directory server having the multi-master replication agreement with the first directory server;

when the operation on the entry is valid in the peer directory server, performing, by the peer directory server, the request in the peer directory server; and when the operation on the entry is not valid in any directory server of the plurality of directory servers, returning a failure for the request, wherein at least one other directory server of the plurality of directory servers is not directly associated with the first directory server.

20. The non-transitory computer-readable storage medium of claim 19, wherein the request is forwarded to only one other directory server at a time, that has not been previously been forwarded to.

21. The non-transitory computer-readable storage medium of claim 19, wherein the operations further comprise:
returning a message of a validity of the operation when the operation on the entry is valid in at least one other directory server.

22. The non-transitory computer-readable storage medium of claim 19, wherein returning a failure for the request to perform the operation comprises:
returning a message of invalidity of the operation to an originating directory server.

23. The non-transitory computer-readable storage medium of claim 19, wherein the operation on the entry in the current directory server is not valid when the entry is not present in the current directory server, and wherein the operation on the entry is not valid in any directory server of the plurality of directory servers when the entry is not present in any directory server of the plurality of directory servers.

24. The non-transitory computer-readable storage medium of claim 19, wherein forwarding the request to the next directory server of the plurality of directory servers further comprises:
adding an identifier of the first directory server to the request.

25. The non-transitory computer-readable storage medium of claim 19, wherein forwarding the request from a current directory server to a next directory server further comprises:
adding an identifier of the current directory server to the request when the operation on the entry in the current directory server is not valid.

26. The non-transitory computer-readable storage medium of claim 25, wherein forwarding the request from a current directory server to a next directory server further comprises:
forwarding the request to a subsequent directory server,
wherein the subsequent directory server is not identified in the request, and the subsequent directory server has a multi-master replication agreement with the first directory server and the next directory server.

27. The non-transitory computer-readable storage medium of claim 19, wherein the operations further comprise:
when the operation on the entry is valid in at least one of the directory servers, operating on the entry in the plurality of directory servers prior to performing the request on the first directory server.

28. The non-transitory computer-readable storage medium of claim 19 wherein the operations further comprise:
maintaining referential integrity in the plurality of directory servers without locking the plurality of directory servers.

* * * * *